US007010959B2

(12) United States Patent
Dingfelder et al.

(10) Patent No.: US 7,010,959 B2
(45) Date of Patent: Mar. 14, 2006

(54) DEVICE AND METHOD FOR MEASURING MECHANICAL PATH LENGTHS BY MEANS OF PNEUMATIC PRESSURE, IN PARTICULAR FOR SLIDING CARBON CONTACTS

(75) Inventors: Herbert Dingfelder, Schwabach (DE); Rainer Hutterer, München (DE)

(73) Assignee: Schleifring und Apparatebau GmbH, Fürstenfeldbruck (DE)

( * ) Notice: Subject to any disclaimer, the term of this patent is extended or adjusted under 35 U.S.C. 154(b) by 0 days.

(21) Appl. No.: 10/812,297

(22) Filed: Mar. 29, 2004

(65) Prior Publication Data

US 2005/0005679 A1 Jan. 13, 2005

(30) Foreign Application Priority Data

Mar. 28, 2003 (DE) ................................ 103 14 397
Oct. 30, 2003 (DE) ................................ 103 50 969

(51) Int. Cl.
*G01B 13/04* (2006.01)

(52) U.S. Cl. ........................................ 73/37.6; 73/49.7

(58) Field of Classification Search ................. 73/37.5, 73/37.6, 49.7; 340/648
See application file for complete search history.

(56) References Cited

U.S. PATENT DOCUMENTS

| | | | | |
|---|---|---|---|---|
| 1,982,528 A * | 11/1934 | Mennesson | 73/37.5 |
| 2,684,568 A * | 7/1954 | Senger | 415/14 |
| 3,002,374 A * | 10/1961 | Jacobs | 73/37.5 |
| 3,499,312 A * | 3/1970 | Eickenhorst | 73/37.5 |
| 3,609,429 A * | 9/1971 | Thompson | 310/246 |
| 3,610,024 A * | 10/1971 | Honjo et al. | 73/37.5 |
| 3,798,959 A * | 3/1974 | Bowles et al. | 73/37.5 |
| 3,889,520 A * | 6/1975 | Stoferle et al. | 73/37.5 |
| 4,542,374 A * | 9/1985 | Kollmannsberger et al. | 340/648 |
| 4,607,960 A * | 8/1986 | Wulff | 374/7 |
| 4,724,701 A * | 2/1988 | Mon | 73/37.5 |
| 4,761,594 A * | 8/1988 | Rodi et al. | 318/490 |
| 4,918,348 A * | 4/1990 | Fitzsimmons et al. | 310/242 |
| 5,386,716 A * | 2/1995 | Thurston et al. | 73/37.5 |
| 5,509,625 A | 4/1996 | Oullette et al. | |

(Continued)

FOREIGN PATENT DOCUMENTS

DE 25 20 520 11/1975

(Continued)

OTHER PUBLICATIONS

USPTO English Translation of DE 196 198 728 to Klaar.*

*Primary Examiner*—Hezron Williams
*Assistant Examiner*—John Fitzgerald
(74) *Attorney, Agent, or Firm*—Kevin L. Daffer; Daffer McDaniel, LLP

(57) ABSTRACT

In a device and a method for measuring path lengths, particularly of brushes in sliding contacts, an air stream having a regularly fluctuating pressure is provided by a pump and conducted via an air supply line and a nozzle to an object to be measured. The object is disposed so that its length or position affects the flow resistance of passing air. A consequent pressure drop in the supply line is determined with a pressure sensor, and an evaluation unit computes, in particular from the difference between maximum and minimum air pressure, a length of the object as a function of the pressure difference. In another embodiment of the invention, pressurized air is supplied from a pump to an object to be measured, and a sensor is disposed to detect a pressure change when the object has attained a predetermined length.

13 Claims, 3 Drawing Sheets

U.S. PATENT DOCUMENTS

| | | | | |
|---|---|---|---|---|
| 5,870,026 | A | 2/1999 | Challenger | |
| 6,034,531 | A * | 3/2000 | Senglat et al. | 324/699 |
| 6,255,955 | B1 * | 7/2001 | Blaettner | 340/648 |

FOREIGN PATENT DOCUMENTS

| | | | |
|---|---|---|---|
| DE | 82 11 804 | | 11/1982 |
| DE | 84 33 023 | | 2/1985 |
| DE | 38 17 743 | | 3/1990 |
| DE | 89 13 117 | | 5/1990 |
| DE | 196 19 728 | | 7/1997 |
| DE | 196 49 212 | | 7/1997 |
| DE | 198 32 617 | | 6/2000 |
| DE | 199 32 024 | | 1/2001 |
| JP | 57101549 | A * | 6/1982 |
| WO | WO 9715099 | A * | 4/1997 |

* cited by examiner

DEVICE AND METHOD FOR MEASURING MECHANICAL PATH LENGTHS BY MEANS OF PNEUMATIC PRESSURE, IN PARTICULAR FOR SLIDING CARBON CONTACTS

FIELD OF THE INVENTION

The present invention relates to a device and a method for non-contacting measurement of mechanical path lengths by pneumatic means, in particular for determining the wear of electrical sliding-contact and slip-ring brushes.

DESCRIPTION OF THE PRIOR ART

Sliding contacts and in particular mechanical slip-rings in which use is made of carbon brushes or brushes of other materials frequently give rise to the problem of detecting progressive wear of the brushes. Worn brushes may lead to interruptions of contact or even to a destruction of sliding contact tracks. For example, if the brushes of slip-rings are worn down to the extent that reliable contact can no longer be ensured, sparking may occur which in turn leads to an increased wear of brushes and sliding contact tracks. Thus, an only brief operation with worn brushes may lead to greater wear of a slide track than occurs during the remaining operating life of the brush. This case may be less critical for commutators of electric motors, where sparks continuously occur and the motor will come to a standstill when contact resistance becomes too large.

When sensors are used for detecting contact wear, one of the needs arising is that of good insulation between sensor and brush, because the brush is usually at a high electrical potential. The insulation must be able to satisfy the relevant safety requirements even following a long period of operation attended by intensive contamination caused by abraded brush material which forms an at least weakly conducting deposit. In addition to known mechanical switches or contacts for detecting brush lengths, optical methods are known. These have the advantage of providing good insulation, but also the disadvantage of having high complexity, thus being costly.

Mechanical switches for detecting the position of the end of a brush are known from DE 199 32 024 and DE 196 49 212 A1. U.S. Pat. No. 4,918,348 describes a contact arrangement in which a contact member is designed as a contacting pressure spring. These devices have the advantage of being of relatively low cost and easy to fabricate. However, they are not particularly robust, because requirements of size permit the use of only relatively small and therefore fragile contact members. These contacts are liable to be mechanically damaged, particularly during a replacement of carbon brushes, then they will no longer indicate the presence of a worn brush. Furthermore, these contacts may be contaminated by carbon dust or other abraded material with the result of their electrical and mechanical operation being impaired.

Further known solutions of the problem concern relatively complicated mechanical devices for actuating a switch contact in the event of extensive contact wear. Devices of this kind are described in DE 82 11 804, DE 198.32 617 A1, and DE 89 13 117. These devices have the advantage over the previously mentioned devices in being mechanically substantially more robust and thus not becoming easily damaged, in particular during an exchange of brushes. Furthermore, the electrical contact system is separate from the mechanical actuation mechanism.

This substantially reduces the danger of operation becoming impeded by abraded particles. However, because of their high complexity these solutions involve considerable outlay and structural size. Therefore they are preferably suitable for large electrical machinery, but not for modern slip-ring systems which usually must be incorporated into an extremely limited assembly space.

An improvement over the above-mentioned devices is offered by electrical systems such as described in DE 84 33 023, U.S. Pat. No. 5,509,625, and U.S. Pat. No. 5,870,026. In these, an insulated conductor is accommodated in a brush. With progressive wear on the brush, the insulation of the conductor is worn away and the conductor contacts the slide track. The electrical contact thus established between the conductor and the slide track may be used for indicating a particular condition of wear. These systems are characterized by being of extremely simple mechanical design, however, they do not permit of any isolation of electrical potentials.

A further improvement is represented by non-contacting optical systems, as described in U.S. Pat. No. 4,761,594. With these, a particular position of the brush back surface can be detected, and optical scanning makes it possible to maintain a separation of electrical potentials.

All of the mentioned systems have the disadvantage of involving much outlay and therefore being expensive to fabricate. Furthermore, they involve the use of a number of complicated electrical and optical components which are prone to failure.

BRIEF SUMMARY OF THE INVENTION

It is an object of the invention to provide a device and a method for performing a non-contacting measurement of a non-abraded length of sliding contact brushes with simple means whilst maintaining a high electrical insulation.

It is a further object of the invention to provide a device and a method for performing a non-contacting determination of the condition of wear of sliding contact brushes used with sliding contact tracks, the device being robust and of simple construction, and capable of being fabricated with only small outlay.

According to a first aspect of the invention the object is achieved by a device for non-contacting measurement of a length of an object to be measured, in particular a non-abraded length of a sliding contact brush, comprising:

a pump for producing a variable pneumatic pressure, preferably an oscillating pressure;

a pressurized air line connecting the pump to a nozzle provided in the vicinity of the object to be measured, so that pressurized air from the pump flows through the pressurized air line and the nozzle onto the object to be measured;

at least one pressure sensor or flow sensor for determining changes of pressure or flow in the pressurized air line; and a measuring amplifier or an evaluation circuit connected to the pressure sensor or flow sensor for evaluating signals from the pressure sensor or flow sensor, by means of which amplitudes of fluctuations of measured air pressure and preferably a difference between maximum and minimum air pressure are evaluated.

Furthermore, according to the first aspect of the invention the object is achieved by a method for non-contacting measurement of path lengths, comprising the steps of:

producing pressurized air having a fluctuating air pressure by means of a pump;

supplying pressurized air having the fluctuating air pressure via a pressurized air line and a nozzle to an object to be measured;

evaluating fluctuations of the fluctuating air pressure by means of a pressure sensor;

processing signals from the pressure sensor by means of an amplifier or evaluation circuit, taking account of pressure fluctuations; and reading out measurement results of the pressure fluctuations.

In accordance with a second aspect of the invention the object is achieved by a device for determining a length of at least one contact brush in a sliding contact track system or collector system, comprising:

a source of pressurized gas:

means for supplying pressurized gas from the source to the at least one contact brush;

at least one pneumatic sensor mechanically connected to the at least one brush;

means for supplying the pneumatic sensor with pressurized gas from the source of pressurized gas; and an evaluation unit for evaluating signals from the pneumatic sensor indicating a pressure drop of the pressurized gas, the pressure drop representing a measure of a length of the brush.

Furthermore, according to the second aspect of the invention the object is achieved by a method for determining the length of at least one contact brush in a sliding contact track system or collector system, comprising the steps of:

feeding a gas into a pneumatic sensor which is preferably integrated into a brush holder for accommodating the at least one contact brush; and measuring a volume or velocity of gas flowing through the pneumatic sensor, or determining a pressure drop of the gas.

BRIEF DESCRIPTION OF THE DRAWINGS

In the following the invention will be further described with the aid of non-limiting examples of embodiment and with reference to the drawings in which.

DETAILED DESCRIPTION OF THE INVENTION

Figure 1:
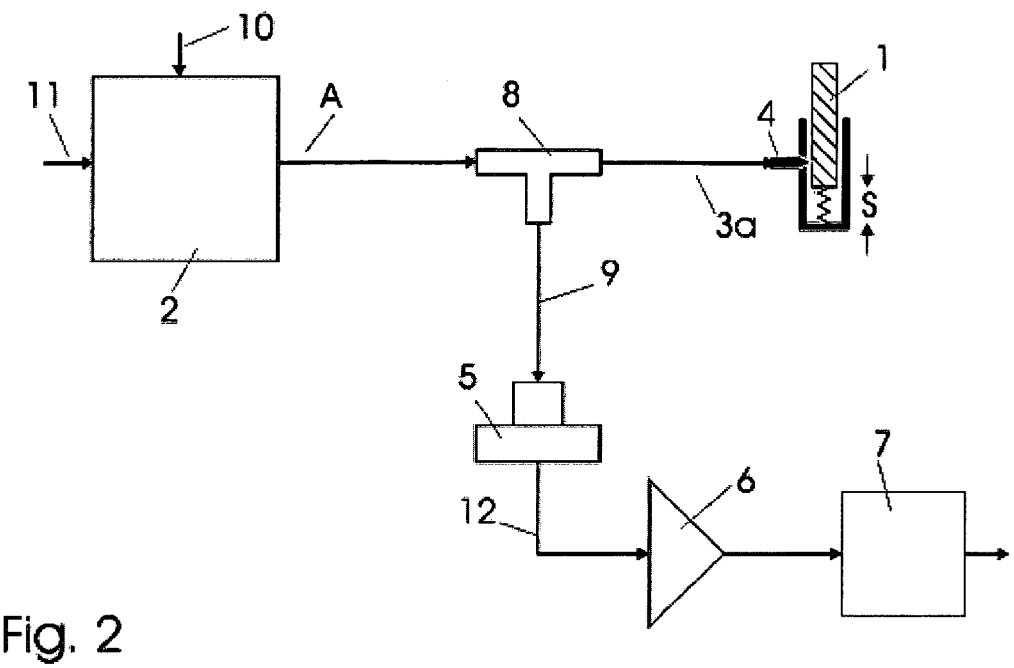
FIG. 1 is a schematic illustration of a device in accordance with a first aspect of the invention.
Figure 2:
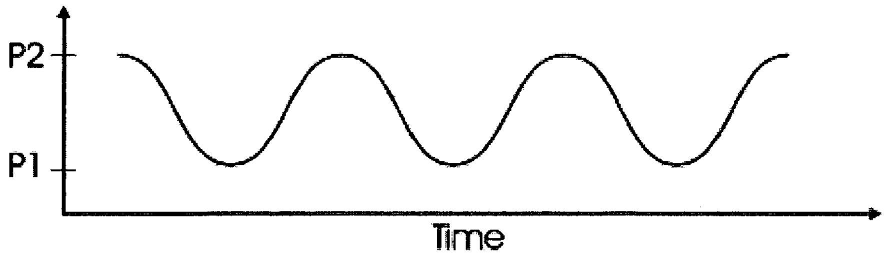
FIG. 2 is a graphical illustration of fluctuating air pressure produced in a first pressure line of the device of FIG. 1 by a pump.

In the device according to the first aspect of the invention as shown in FIG. 1, a non-contacting measurement of a length or a path is performed by means of a pulsating air current. A pump 2, preferably driven by an electric motor connected to an electrical supply line 10 and operated at 24 V d.c., or by any other power source, takes in air through an air intake 11 and generates a pulsating air pressure. Of course, any other suitable gas such as nitrogen or an insulating inert gas may be used. Pumps for producing the air pressure changes may be piston pumps, diaphragm pumps particularly having a piezo diaphragm, or other pumps of known type. It is essential to the invention that the pump produce a defined fluctuating preferably an oscillating air pressure at its outlet to a pressurized air line 3. FIG. 2 shows fluctuations of pressure between values P1 and P2 at a pump outlet in the line 3. Optionally, the pressure value may fluctuate in a positive direction, for example from +100 mbar to +200 mbar, or in a positive and negative direction, for example from −100 mbar to +100 mbar. The absolute value of the air pressure, whether in a range of only a few mbar or in a range of a few bar, is determined by the design of the pneumatic system. Air of fluctuating pressure is supplied through a pressurized air line 3*a* to the object to be measured which in this case is shown as a sliding contact brush or carbon rod 1 in a tubular holder.

Preferably a measuring nozzle 4 is mounted in the close vicinity of the object. In the case of a positive air pressure value, the air flows in the direction of the object to be measured, and in the case of a negative air pressure value, the air flows in the reverse direction. The air flow will meet with a certain resistance, depending upon the position of the nozzle 4 with respect to the object being measured. This results in flow velocities or corresponding pressure drops in the pressurized air line 3*a*, which are a function of a path length which in the case shown is the distance S between the end of the brush or carbon rod 1 and the closed inside end of the tubular holder. Thus the volume V of air flowing through the end of the pressurized air line 3*a* in a time t satisfies the relationship $$V/t=f(S).$$

The dynamic pressure at the nozzle 4 will also be a function of the distance S.

Figure 3:
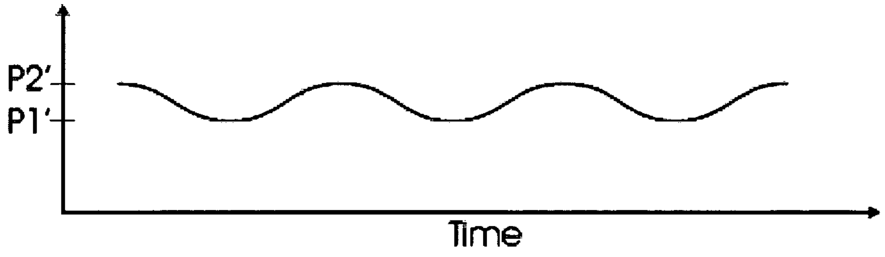
FIG. 3 is a graphical illustration of fluctuating air pressure produced in a second pressure line of the device of FIG. 1.

The flow velocities or pressure drops can be determined, for example with a velocity sensor or pressure sensor. A simple arrangement of the pneumatic system involves the use of a T junction 8 for connecting a first pressure sensor 5 via a pressurized air line 9 to the pressurized air lines 3 and 3*a*. An electrical signal 12 given by the pressure sensor 5 can be amplified by means of a suitable amplifier 6 or evaluation circuit 7 and evaluated. Preferably only the difference between minimum air pressure P1' and maximum air pressure P2', as shown in FIG. 3, or the difference between minimum and maximum flow velocities, is evaluated using the relationship $$(P2'-P1')=f(S).$$

For this, an a.c. or d.c. coupled amplifier 6, or an a.c. coupled evaluation circuit 7 can be used. This has the advantage that small fluctuations of pressure or flow velocity which may be caused by pressure changes of ambient air do not affect the results of the measurements.

In order to make possible a particularly exact measurement, at least one further, or second pressure or flow sensor is provided in the line 3 at a position A which is closer to the pump 2 than is the tapping position, i.e. the T junction 8. The pressure drop in the line 3 can be measured by evaluating the difference between the signals supplied by the first sensor 5 and the second sensor. Thus it is possible to measure the ratio of the pressure drop in the line 3 to the pressure drop at the nozzle 4, and to perform measurements which are not affected by changes of the pump. A second nozzle which is connected to the second sensor may be used in place of the T junction 8.

In another embodiment of the invention, a control circuit is provided which uses the signal of the second sensor disposed closer to the pump 2 than the first sensor 5 to generate a suitable correction signal for operation of the pump 2, so that the pump 2 produces pressure fluctuations of constant pressure difference.

Another advantageous embodiment of the invention provides a measurement by determination of the power consumption of the pump 2. The pump 2 is designed to have a piezo diaphragm movable by electrical signals, and the diaphragm is preferably incorporated in a brush holder for carbon brushes, so that the power consumption of the piezo diaphragm is a measure of the flow resistance caused at the nozzle 4 by the length of a carbon brush, and can therefore directly be used for the purpose of evaluation.

In order to generate a position-dependent measurement signal, as shown in FIG. 1, the carbon rod is preferably beveled towards its rear end, so that with increasing consumption of the rod the average distance between the rod and the wall of the tubular holder becomes larger resulting in a higher air flow or pressure drop with increasing brush wear. Alternatively, the nozzle 4 may be disposed along the longitudinal direction of the holder instead of being at the side. It would also be possible to code the length of the object or carbon brush to be measured by means of different surface structures. For example, the surface roughness of the carbon brush may be increased towards the end of the brush. The change of surface resistance with change of surface roughness towards the end can be used for detecting the change of length. For example, a device according to the invention may be employed for determining the lateral or axial trueness of running of sliding contact tracks.

Any other device for generating pressure fluctuations, such as a pressure vessel or reservoir with valves positioned on a downstream side, may be used instead of a pump.

By evaluating the alternating air-pressure signal various conclusions may be drawn. These concern, for example, the distance between the nozzle and the object to be measured, and also the remaining length of a contact brush in dependence upon its geometry. In the same way, general conclusions may be drawn concerning the surface structure.

A device according to a second aspect of the invention comprises at least one pneumatic sensor which is mechanically connected to a brush to be monitored. Pneumatic sensors are preferably supplied with gas from a pressure source which is under a pressure that is increased with respect to ambient pressure. Pressure sources of this kind may be, for example, pressurizing pumps or even pressurized vessels. Preferably air is used as the gas. In the same manner, of course, nitrogen or any other preferably inert gas may be used. According to the position of the sensor, a pressure drop is observed which represents a measure of the length of the brush. The value of this pressure drop may be passed to a pneumatic control system, for example. This pneumatic control system may in turn cause a following movement of a worn brush. Alternatively, the pressure value may be converted to electrical or other mechanical values. When a pneumatic sensor is used, only a gas contacts the brush or is introduced into the vicinity of the brush. Thus a galvanic isolation is automatically attained. In addition, a self-cleaning of the system may be achieved by means of the gas. Because the entire system is under excess pressure, no abraded material from the brush or a sliding contact track can penetrate into the sensor system. Thus a long lifetime and a high reliability are achieved.

The pressure signal of the sensor may be conducted to evaluating units located at a distance from the place of measurement using simplest means, i.e. simple flexible tubing or pipes.

In another advantageous embodiment of the invention, at least one pneumatic sensor is connected to the brush to be measured via levers and rod linkages. For this, the pneumatic sensor itself may be optimized to provide high linearity of detected pressure drop as a function of the length being measured. A sensor which is optimized for a particular application is then coupled to the object to be measured, i.e. the brush, by mechanical means.

In another advantageous embodiment of the invention at least one sensor is incorporated in a brush holder accommodating the brush. This functional incorporation allows the achievement of a particularly compact and inexpensive solution. Furthermore, cleaning of the brush holder may be achieved because a gas flows through the holder. With this design of a brush holder incorporating a pneumatic sensor, the gas is preferably blown directly into the interior of the holder.

In another advantageous embodiment of the invention at least one brush holder is provided with at least one flow channel extending parallel to the brush. For example, the flow channel may be covered by the brush, so that the gas can escape through the flow channel alongside the brush. With a brush of greater length a longer area is covered. Thus the flow channel also has a greater length. The flow resistance is also correspondingly larger. This leads to a smaller pressure loss. Of course, instead of one flow channel, a plurality of smaller flow channels may be connected in parallel. Optionally the cross-section of a flow channel may be constant, or may vary in dependence upon its location. By this means the characteristic of the sensor may be optimized.

For the detection of a particular length of a brush a lateral bore may be provided in a brush holder. A new carbon brush or rod will cover this bore, allowing no gas to escape through the bore. Progressive consumption of the carbon will reduce its length, so that at a particular length or less it will no longer be able to cover the bore through which gas can then escape. Thus, a brush holder containing a worn-down carbon brush will give rise to a substantially lower flow resistance and therewith a higher pressure drop than a brush holder containing an unworn brush.

It is advantageous to make use optionally of at least one pressure sensor or at least one flow sensor for a conversion of the signals from pneumatic sensors. Pressure sensors are particularly simple and economic, and therefore to be preferred in the majority of applications. The disadvantage of a pressure measurement is that flow resistances in other parts of the system can falsify a pressure measurement. A flow measurement (volume or velocity) yields more precise results, but requires more outlay when put into practice.

Furthermore, a manifold is optionally provided for distributing the gas from the pressure source to a plurality of pneumatic sensors. If the manifold is a simple tubular system having a plurality of connectors, then all pneumatic sensors connected thereto are disposed in parallel. With this, the pressure in the manifold can be determined advantageously by means of a simple pressure measurement, and thus a measure obtained of the total gas escaping along all pneumatic sensors.

According to a further advantageous development the manifold is provided with a switch function. Thus, the single pneumatic sensors are not simply disposed in parallel.

Rather than this, a selection can be made of the pneumatic sensor to be connected to the pressure source. In this way a selective determination of the wear of single brushes or single groups of brushes becomes possible.

Another development of the invention provides a clocked pressure source. The service life of normal brushes is of the magnitude of a few 1000 up to 100,000 operating hours. Therefore it is sufficient to perform measurements at large intervals of time. For example, when applied to computer tomographs the measurements could be performed once a day when the instrument is switched on. For this, in the case of a pressure pump it is of advantage to provide a control unit which is controlled, for example, by a measurement system or a simple clock and briefly supplies current to the pump for performance of the measurement at desired times. In the case of a pressure reservoir, a supply of pressure may be controlled by means of a valve. With this, using small pressure reservoirs or capsules, a period of measurement corresponding to the service life of the brushes may be achieved. The pressure reservoirs may then be replaced together with the brushes.

Another development of the invention provides that the pressure source be designed for emitting pressure pulses. Thus, a dynamic measurement may be performed instead of a static pressure or flow measurement.

In another development of the invention the entire pneumatic system may be purged under increased pressure for the purpose of cleaning the brush holders. With this increased pressure, any contamination such as carbon powder that may have entered the system can be removed. This at the same time makes it possible to remove contamination from a sliding contact track located below the brushes concerned.

In addition to enabling a determination of the carbon consumption, a dynamic measurement can also allow conclusions to be drawn concerning true running tolerances of slip rings. In an ideal case the brushes continuously contact a sliding contact track. By measurements of the brush height during revolutions, or at least at several positions along the circumference, the track level or fluctuations of the track level may be determined.

Measurements of brush height can also lead to a simple indication of the exact adjustment or alignment of brush blocks having a plurality of brushes. For example, with a large block, a brush having length measurement facilities can be provided at each end. During assembly or adjustment of the brush block the measurement values or limiting values may be indicated. With this, the brush block may be adjusted to be exactly parallel to the track. Thus, uniform contact pressure forces and a longer service life result.

Furthermore, a resetting of single brushes or a whole brush block having a plurality of brushes can be performed in accordance with the measurements of brush consumption. Thus an excursion of a spring urging a brush into contact with a sliding contact track, and consequently also the contact pressure of individual brushes, can always be maintained constant. A readjustment can be made, for example, by sliding two wedge-shaped blocks of material carrying a brush holder support plate towards or away from each other, or with a brush block adjustably suspended at two places from two parallel beams. A drive for the readjustment can be made advantageously by using a screw spindle. No high readjustment speeds are required, but it is of advantage to maintain the position without supplying power to a drive motor.

Furthermore, an evaluation of the sensor signals can be performed by means of an evaluation unit. As a result of this evaluation, for example, the remaining service life or movement path of sliding contact tracks, or also the number of revolutions in the case of slip rings may be outputted.

Figure 4:
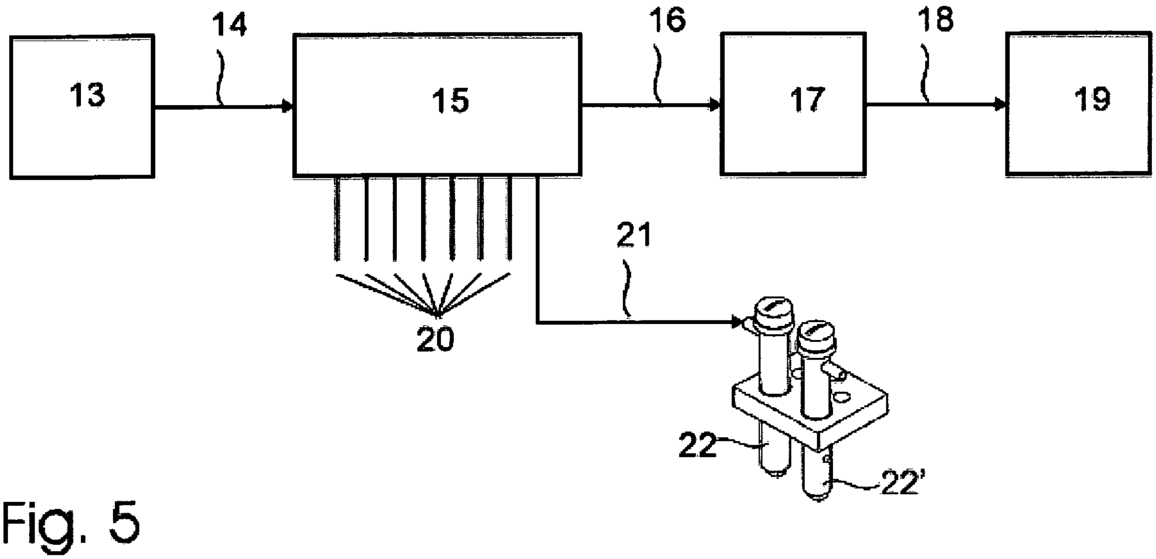
FIG. 4 is a schematic illustration of a device in accordance with a second aspect of the invention.

FIG. 4 shows in schematic form a device according to the second aspect of the invention. A pressure source which may be designed, for example, as a pressure pump 13 supplies pressurized gas through a pressure line 14 to a manifold 15. From the manifold 15 the gas is further distributed through at least one further pressure line 21 to at least one brush holder 22. In an advantageous manner further connectors 20 are available for a connection of further brush holders. Furthermore, a pressure sensor 17 is provided, which is connected to the pneumatic system by means of instrument leads 16. For this, the connection can be made optionally to the pump, the manifold, one or more brush holders, or desired other points of the system. An output signal from the pressure sensor 17 is transmitted through a signal line 18 to an evaluation unit 19. In this example the brush holders 22 are designed to be pneumatic sensors. The flow resistance of the pneumatic sensors decreases according to the brush length, so that with increasing brush consumption the pressure in the pneumatic system drops. This can now be evaluated via the pressure sensor.

Figure 5:
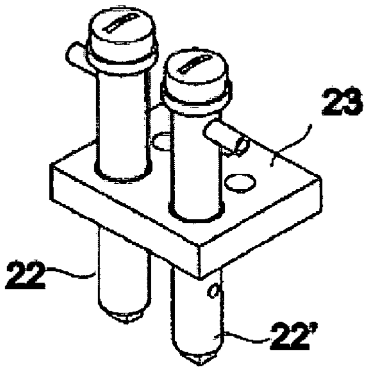
FIG. 5 is a perspective view of two tubular brush holders mounted on a common support plate of the device of FIG. 4.

FIG. 5 shows a perspective view of two tubular brush holders 22 and 22' mounted on a support plate 23. These brush holders are at the same time designed to be pneumatic sensors.

Figure 6:
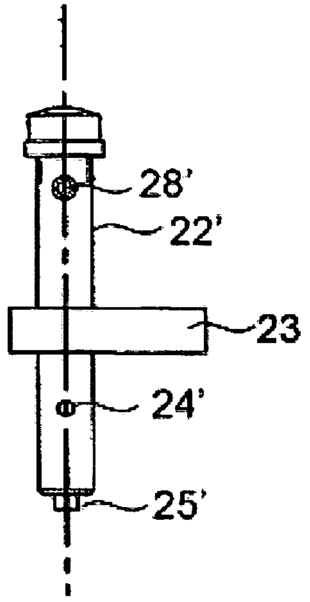
FIG. 6 is an end view of a tubular brush holder mounted on a support plate of the device of FIG. 4.

FIG. 6 shows an end view of the tubular brush holder 22'. The description given here of the holder 22' applies correspondingly to the holder 22. A brush 25' projects from the lower end of the brush holder 22'. A brush of this kind is advantageously press-fabricated from a mixture comprising graphite and other components. Optionally it may be of round or angular cross-section. A feed of pressurized gas is made preferably via a connector nozzle 28'. A bore 24' is provided as a gas exit. This bore 24' is normally covered or blocked by a brush 25', so that only little gas can escape. If the brush 25' has been much worn-down, it will be too short to cover the bore 24'. Then the gas which flows in through the connector nozzle 28' can escape through the bore 24'. This causes a large pressure drop in the system, which can be detected by the pressure sensor 17. In addition, a seal may be provided at the upper end of the brush 25'.

Of course, the gas entry and gas exit openings may be interchanged without affecting the basic concept of the invention. It is also possible to operate with negative pressure instead of positive pressure. The position of the bore 24' will determine the length or position of the brush 25' at which an indication of wear occurs. Instead of the bore 25', a plurality of bores may be provided, for example having different cross-sections. With these it is possible to achieve a multi-stage indication.

Figure 7:
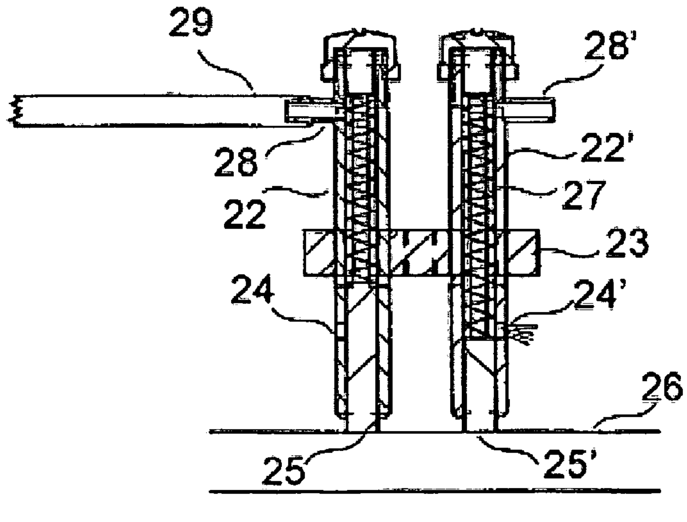
FIG. 7 is a view of a section through two brush holders along the vertical broken line in FIG. 6, as seen from the left-hand side.

FIG. 7 is a view of a section through the two brush holders 22 and 22' along the vertical broken line in FIG. 6, as seen from the left-hand side. This section corresponds to a section through the brush holders 22 and 22' shown in the perspective view of FIG. 5. To supplement the other Figures, a sliding contact track 26 along which the brushes 25 and 25' can slide is shown. Also shown is connection tubing 29 for supplying gas to a connector nozzle 28 of the tubular holder 22. The brushes 25 and 25' are each urged onto the sliding contact track 26 by a spring 27. In an only slightly worn condition, as shown for the brush 25 on the left-hand side of FIG. 7, the bore 24 is closed or obstructed by the brush 25. On the right-hand side of FIG. 7 a more strongly worn brush 25' is shown which is so short that it no longer covers the bore 24'. Thus, gas can escape through the bore 24'.

The invention claimed is:

1. A device for non-contacting measurement of a length of an object to be measured, in particular a non-abraded length of a sliding contact brush, comprising:

a pump for producing a variable pneumatic pressure;

a pressurized air line connecting the pump to a nozzle provided in the vicinity of the object to be measured, so that pressurized air from a the pump flows through the pressurized air line and the nozzle onto the object to be measured;

at least one pressure sensor or flow sensor for determining changes of pressure or flow in the pressurized air line; and a measuring amplifier or an evaluation circuit connected to the pressure sensor or flow sensor for evaluating signals from the pressure sensor or flow sensor, by means of which amplitudes of fluctuations of measured air pressure and preferably a difference between maximum and minimum air pressure are evaluated.

2. A device according to claim 1, wherein at least one nozzle incorporated in a sliding contact brush holder adapted to receive the brush.

3. A device according to claim 1, wherein at least one nozzle comprises at least one flow passage extending parallel to the brush, a length and or cross-section of the flow passage being changed according to a position of the brush.

4. A device according to claim 1, wherein a mechanism is provided for adjusting an entire height of a brush block comprising a plurality of brushes according to signals of pneumatic sensors.

5. A device according to claim 1, wherein a plurality of nozzles are connected to said pump by means of a manifold.

6. A device according to claim 5, wherein the manifold has a switching function for selective supply of pressure to particular nozzles.

7. A method for non-contacting measurement of the lengths of a sliding contact brush, comprising the steps of:

producing pressurized air having a fluctuating air pressure by means of a pump;

supplying pressurized air having the fluctuating air pressure via a pressurized air line and a nozzle to said sliding contact brush;

evaluating fluctuations of the fluctuating air pressure by means of a pressure sensor;

processing signals from the pressure sensor by means of an amplifier or evaluation circuit, taking account of pressure fluctuations; and reading out measurement results of the pressure fluctuations.

8. A device for determining the length of at least one contact brush in a sliding contact track system, comprising:

a source of pressurized gas;

means for supplying pressurized gas from the source to the at least one contact brush;

at least one pneumatic sensor mechanically connected to the at least one brush;

means for supplying the pneumatic sensor with pressurized gas from the source of pressurized gas;

an evaluation unit for evaluating signals from the pneumatic sensor indicating a pressure drop of the pressurized gas, the pressure drop representing a measure of a length of the brush, and wherein at least one pneumatic sensor is connected via layers and rod linkages to the brush to be monitored.

9. A device for determining the length of at least one contact brush in a sliding contact track system, comprising:

a source of pressurized gas;

means for supplying pressurized gas from the source to the at least contact brush;

at least on pneumatic sensor mechanically connected to the at least one brush;

means for supplying the pneumatic sensor with pressurized gas from the source of pressurized gas;

an evaluation unit for evaluating signals from the pneumatic sensor indicating a pressure drop of the pressurized gas, the pressure drop representing a measure of a length of the brush; and wherein the pressure source is designed to emit pressure pulses.

10. A device for determining the length of at least one contact brush in a sliding contact track system, comprising:

a source of pressurized gas;

means for supplying pressurized gas from the source to the at least one contact brush;

at least one pneumatic sensor mechanically connected to the at least one brush;

means for supplying the pneumatic sensor with pressurized gas from the source of pressurized gas;

an evaluation unit for evaluating signals from the pneumatic sensor indicating a pressure drop of the pressurized gas, the pressure drop representing a measure of a length of the brush; and wherein the entire pneumatic system is adapted to be purged with gas under increased pressure.

11. A device for determining the length of at least one contact brush in a sliding contact track system, comprising:

a source of pressurized gas;

means for supplying pressurized gas from the source to the at least one contact brush;

at least one pneumatic sensor mechanically connected to the at least one brush;

means for supplying the pneumatic sensor with pressurized gas from the source of pressurized gas;

an evaluation unit for evaluating signals from the pneumatic sensor indicating a pressure drop of the pressurized gas, the pressure drop representing a measure of a length of the brush; and wherein a mechanism is provided for adjusting an entire height of a brush block comprising a plurality of brushes according to signals of pneumatic sensors.

12. A device for non-contacting measurement of a length of an object to be measured, in particular a non-abraded length of a sliding contact brush, comprising:

a pump for producing a variable pneumatic pressure;

a pressurized air line connecting the pump to a nozzle provided in the vicinity of the object to be measured, so that pressurized air from the pump flaws through the pressurized air line and the nozzle onto the object to be measured;

at least one pressure sensor or flow sensor for determining changes of pressure or flow in the pressurized air line; and a measuring amplifier or an evaluation circuit connected to the pressure sensor or flow sensor for evaluating signals from the pressure sensor or flow sensor, by means of which amplitudes of fluctuations of measured air pressure are evaluated.

13. A device for non-contacting measurement of a length of an object to be measured, in particular a non-abraded length of a sliding contact brush, comprising:

a pump for producing a variable pneumatic pressure;

a pressurized air line connecting the pump to a nozzle provided in the vicinity of the object to be measured, so that pressurized air from the pump flows through the pressurized air line and the nozzle onto the object to be measured;

at least one pressure sensor or flow sensor for determining changes of pressure or flow in the pressurized air line; and a measuring amplifier or an evaluation circuit connected to the pressure sensor or flow sensor for evaluating signals from the pressure sensor or flow sensor, by means of which a difference between maximum and minimum air pressure is evaluated.

* * * * *

UNITED STATES PATENT AND TRADEMARK OFFICE

CERTIFICATE OF CORRECTION

PATENT NO. : 7,010,959 B2
APPLICATION NO. : 10/812297
DATED : March 14, 2006
INVENTOR(S) : Dingfelder et al.

It is certified that error appears in the above-identified patent and that said Letters Patent is hereby corrected as shown below:

<u>Column 9:</u>
line 7: Please delete "a" after the phrase "pressurized air from".
line 62: Please delete "layers" and substitute therefor --levers--.

<u>Column 10:</u>
line 48: Please delete "flaws" and substitute therefor --flows--.

Signed and Sealed this

Seventeenth Day of October, 2006

JON W. DUDAS
*Director of the United States Patent and Trademark Office*